Aug. 14, 1923.

J. W. WEBB 1,464,894

SIGNALING DEVICE

Filed April 6, 1922

2 Sheets-Sheet 2

John W. Webb Inventor

By Rector, Hibben, Davis & Macauley
His Attys

Aug. 14, 1923.
J. W. WEBB
SIGNALING DEVICE
Filed April 6, 1922
1,464,894
2 Sheets-Sheet 1
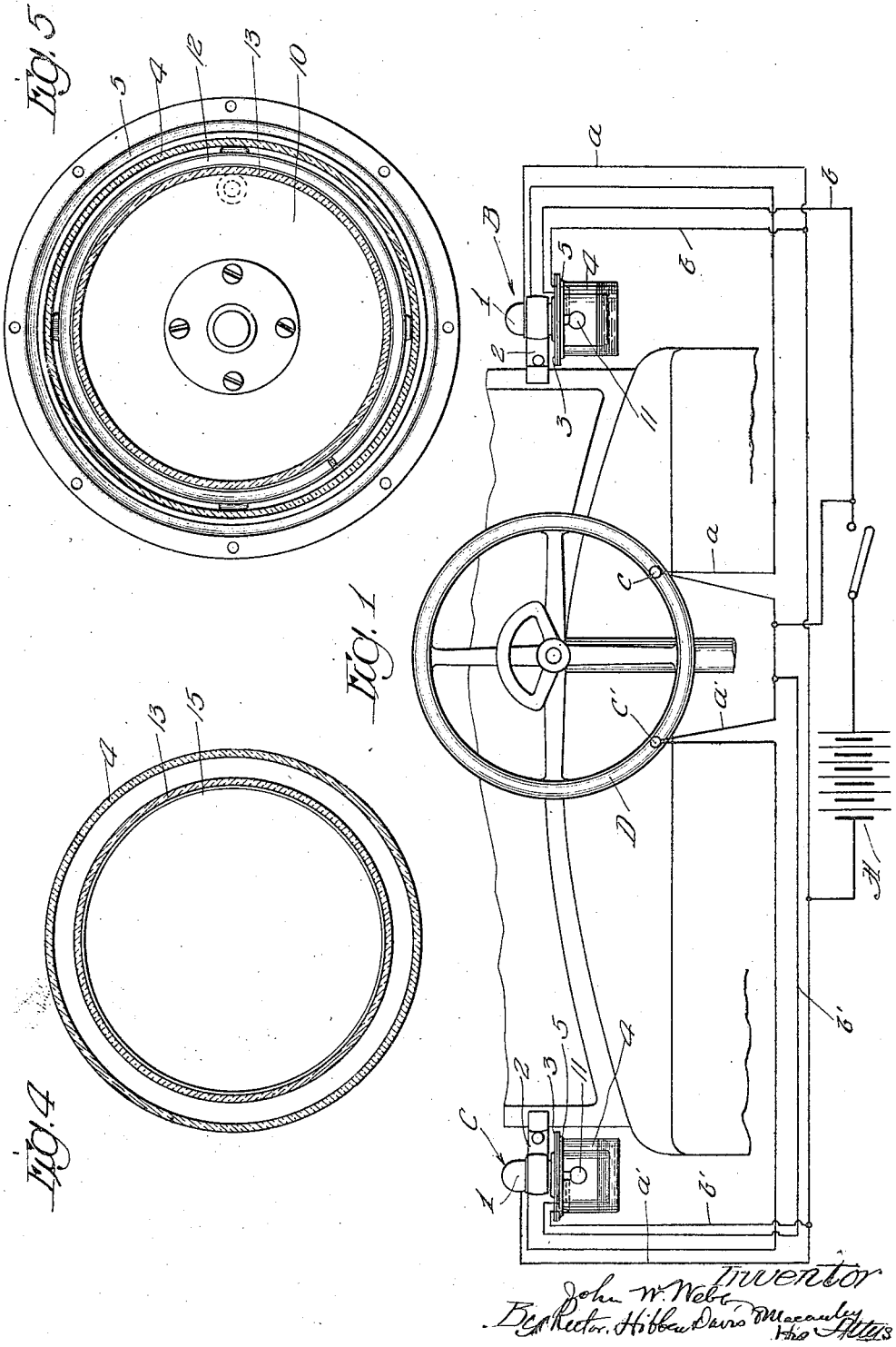

Patented Aug. 14, 1923.

1,464,894

UNITED STATES PATENT OFFICE.

JOHN W. WEBB, OF CHICAGO, ILLINOIS.

SIGNALING DEVICE.

Application filed April 6, 1922. Serial No. 550,095.

*To all whom it may concern:*

Be it known that I, JOHN W. WEBB, a citizen of the United States, residing at Chicago, in the county of Cook and State of Illinois, have invented certain new and useful Improvements in Signaling Devices, of which the following is a specification.

My invention relates to illuminated signaling devices intended more particularly for use on motor cars and designed to be used for the purpose of giving timely warning, when traveling, of the intention of the driver to make a turn and advise others of the direction in which the turn will be made, thus eliminating one source of frequent accidents in the driving of motor cars. The object of my invention is generally the production of an effective signaling equipment which may be easily and simply operated to give a conspicuous warning of the coming movement of the car, and to this end I have devised and invented the novel signaling apparatus hereinafter described in detail, my invention consisting in the novel arrangement, construction and mode of operation of the parts and members of the device, the essential elements of my invention being more particularly pointed out in the appended claims, it being understood, however, that various changes and modifications of structure are possible within the scope and intendment of such claims.

Figure 3:
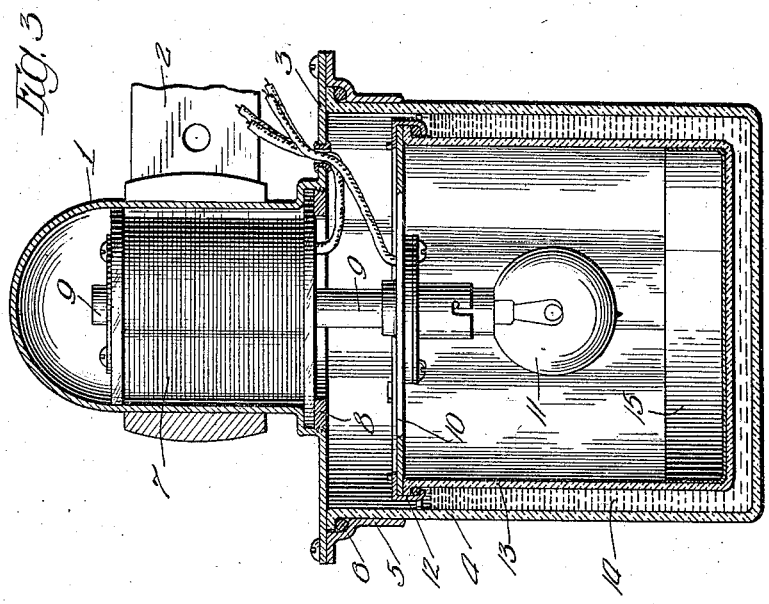
Figure 2:
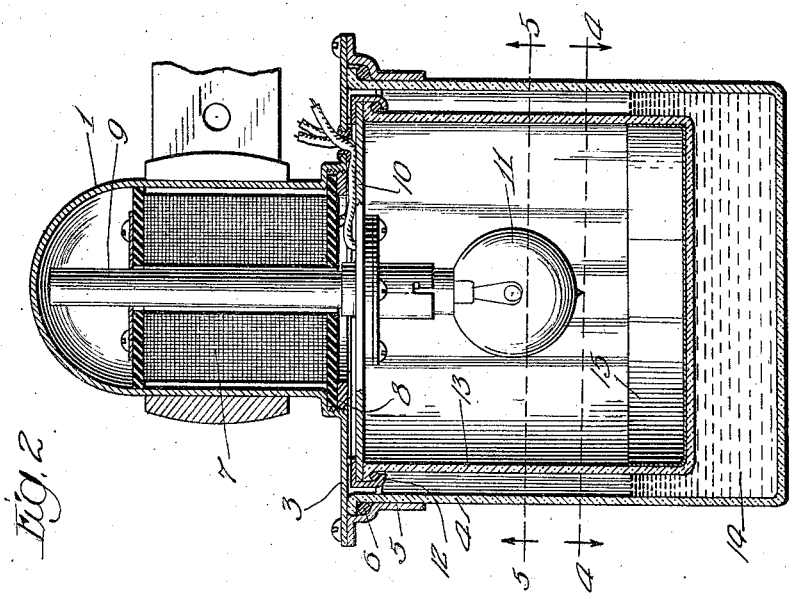

Figure 1 of the accompanying drawings is a rear view of the cowl and windshield of an automobile, showing my invention applied thereto, the electrical system forming part of the means for energizing the solenoid magnets employed as a part of the apparatus being diagrammatically shown; Fig. 2 is a central vertical section of one of the devices with the core of the solenoid and electric light in uppermost position, whereby a white light is displayed; Fig. 3 is a similar view, but with the magnet energized and the core and associated parts depressed to afford a red-colored signal; Fig. 4 is a horizontal section on the dotted line 4—4 of Fig. 2; and Fig. 5 is a horizontal section on the line 5—5 of Fig. 2, looking upward, as indicated by the arrow.

The same reference characters indicate the same parts in all the figures of the drawings.

My novel signaling devices are designed to be employed in pairs, one in each side of a car, attached to the side-members of the wind shield, or supported in a similar position upon the cowl of the machine. The warning signals are given by means of electro-magnets actuated through electric conductors governed by switch members located on the steering wheel of the car, as in the case of my co-pending application Serial No. 550,094, filed April 6, 1922 in which I have made claims to the subject-matter which is common to that application and the present one.

Referring to Figure 1, the electric current required for energizing the electro-magnets and illuminating the incandescent lamps of the devices may be taken from the storage battery usually employed in the power plant of modern automobiles, the battery being represented diagrammatically by the letter A, and the conductors employed for the purposes mentioned include two branch solenoid circuits $a$ and $a'$ for the two devices, marked B and C, respectively, and two branch lamp circuits $b$ and $b'$. The solenoid circuits $a$ and $a'$ are respectively controlled by switches $c$ and $c'$, which are conveniently located on the steering wheel D of the car.

Referring to Figs. 2 and 3 for a more detailed illustration of the signaling devices proper (which are, or may be, identical in construction), each device is provided at the top with a solenoid housing 1 through which it may be conveniently secured to the supporting bracket 2. The base of the housing is extended to form a horizontal flange 3, against the under side of which is seated a clear glass cup 4 exteriorly flanged at the top to cooperate with a coupling ring 5 secured to the flange 3, a gasket 6 being employed to provide a tight cushioned joint.

The solenoid 7 is secured within the housing 1 by means of a retaining ring 8, and its core 9 carries a disk 10 to which is axially secured the incandescent electric lamp 11 which constitutes the source of illumination. Secured to the disk 10 by means of a peripheral clamping member 12 is an inner cup 13, also made of clear glass. Between the cups 4 and 13 is interposed a body of transparent colored liquid 14, and the proportions of the cups and the volume of the liquid is such that when the inner cup is in normal elevated position the level of the liquid will be below the lamp 11 and the lamp will display a white light, while when the lamp is in lowermost position the level of the liquid will be raised so that the light shining through it will be colored to give a warning signal. An opaque shield 15 is provided to intercept the rays travelling downwardly and prevent any trace of color from reflection or refraction of rays which otherwise would pass through the liquid in the bottom of the cup. The buoyancy of the liquid (which if necessary may be assisted by a spring) maintains the inner cup and associated parts in upper position except when the magnet is energized to draw the armature core downward, for the purpose and with the result already explained.

By operation of one or the other of the switches $c$ and $c'$ the driver of the machine is enabled to give warning as he approaches a cross street of his intention to make a turn, and do so by means which will indicate the direction in which he intends to proceed.

It will be understood that the lamps 11 are both constantly lighted to give (except when a warning colored signal is displayed at one device) an indication through the white uncolored lights of the position and movement of the vehicle.

I claim:

1. An illuminated signaling device comprising a clear glass outer cup, a clear glass inner cup, a body of colored liquid between the lower portions of said cups, means for shifting one cup toward the other at will to force liquid between the sides of the cups, and a lamp arranged within said inner cup.

2. An illuminated signaling device comprising a clear glass outer cup, a clear glass inner cup, a body of colored liquid between the lower portions of said cups, means for depressing said inner cup at will to force liquid between the side of the cups, and a lamp arranged within said inner cup.

3. An illuminated signaling device according to claim 1 in which said outer and inner cups have cylindrical sides concentrically arranged.

4. An illuminated signaling device according to claim 1 in which said lamp is carried by said inner cup.

5. An illuminated signaling device according to claim 1 in which a shield is interposed between the lamp and the bottom portions of said cups.

6. An illuminated signaling device according to claim 1 in which said inner cup is provided with an opaque shield over its bottom portion.

7. An illuminated signaling device comprising a solenoid housing, a solenoid within said housing having a core normally raised relatively to the solenoid, a clear glass outer cup arranged below said housing and secured thereto, a clear glass inner cup secured to the core of said solenoid, a body of colored liquid between the lower portions of said outer and inner cups, an electric lamp carried by said inner cup, and means for energizing said solenoid at will to shift one of said cups towards the other and force liquid between the sides of said cups.

8. An illuminated signaling device according to claim 7 in which said solenoid housing extends laterally at its base to form a closure for said outer cup.

9. An illuminated signaling device according to claim 7 in which said inner cup is secured to a closure disk with which the solenoid core and lamp are rigidly connected.

10. An illuminated signaling device according to claim 7 in which said solenoid housing is secured in stationary position to a supporting bracket.

JOHN W. WEBB.